(12) United States Patent
Volonterio et al.

(10) Patent No.: US 8,479,582 B2
(45) Date of Patent: Jul. 9, 2013

(54) PRESSURE TRANSMITTER

(75) Inventors: Eugenio Volonterio, Appiano Gentile (IT); Rossano Marchesi, Dongo (IT)

(73) Assignee: ABB Technology AG, Zürich (CH)

( * ) Notice: Subject to any disclaimer, the term of this patent is extended or adjusted under 35 U.S.C. 154(b) by 19 days.

(21) Appl. No.: 13/340,218

(22) Filed: Dec. 29, 2011

(65) Prior Publication Data
US 2012/0125112 A1    May 24, 2012

Related U.S. Application Data

(63) Continuation of application No. PCT/EP2009/058292, filed on Jul. 1, 2009.

(51) Int. Cl.
*G01L 7/00* (2006.01)
*G01L 15/00* (2006.01)

(52) U.S. Cl.
USPC ............................................. 73/756; 73/706

(58) Field of Classification Search
None
See application file for complete search history.

(56) References Cited

U.S. PATENT DOCUMENTS

| | | | | |
|---|---|---|---|---|
| 5,524,492 A * | 6/1996 | Frick et al. | ...................... | 73/706 |
| 5,922,965 A * | 7/1999 | Behm et al. | ...................... | 73/706 |
| 7,258,021 B2 * | 8/2007 | Broden | ............................ | 73/756 |
| 7,373,831 B2 * | 5/2008 | Broden | ............................ | 73/715 |
| 2003/0177837 A1 * | 9/2003 | Broden et al. | ................... | 73/716 |
| 2005/0193825 A1 | 9/2005 | Otsuka | | |
| 2006/0162458 A1 * | 7/2006 | Broden | ............................ | 73/708 |
| 2006/0162459 A1 * | 7/2006 | Broden | ............................ | 73/715 |
| 2007/0234813 A1 * | 10/2007 | Hedtke | ............................ | 73/706 |
| 2012/0079884 A1 * | 4/2012 | Broden et al. | ................... | 73/717 |
| 2012/0197553 A1 * | 8/2012 | Volonterio et al. | .............. | 702/50 |

FOREIGN PATENT DOCUMENTS

JP    2005-207875 A    8/2005

OTHER PUBLICATIONS

International Search Report (PCT/ISA/210) issued on Mar. 24, 2010, by European Patent Office as the International Searching Authority for International Application No. PCT/EP2009/058292.
Written Opinion (PCT/ISA/237) issued on Mar. 24, 2010, by European Patent Office as the International Searching Authority for International Application No. PCT/EP2009/058292.

\* cited by examiner

*Primary Examiner* — Andre Allen
(74) *Attorney, Agent, or Firm* — Buchanan Ingersoll & Rooney PC

(57) ABSTRACT

A pressure transmitter includes a sensor assembly having a hollow body housing a pressure sensor. The pressure transmitter also includes a support body which is made of a first material, and an interface body which is connected to the support body and which is made of a second material different from the first material. A first isolation diaphragm is fixed onto the interface body and is made of the same material of the interface body. The first isolation diaphragm is in fluid communication with the pressure sensor and is configured for interfacing with a process fluid.

23 Claims, 2 Drawing Sheets

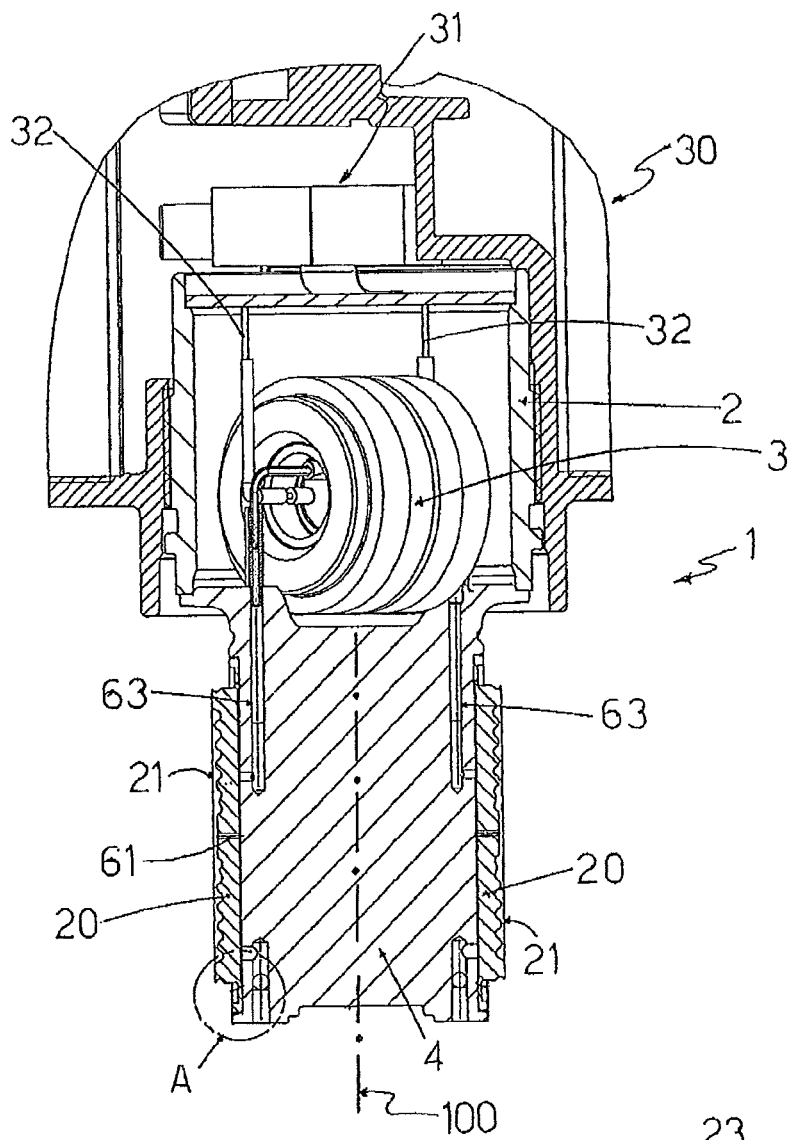
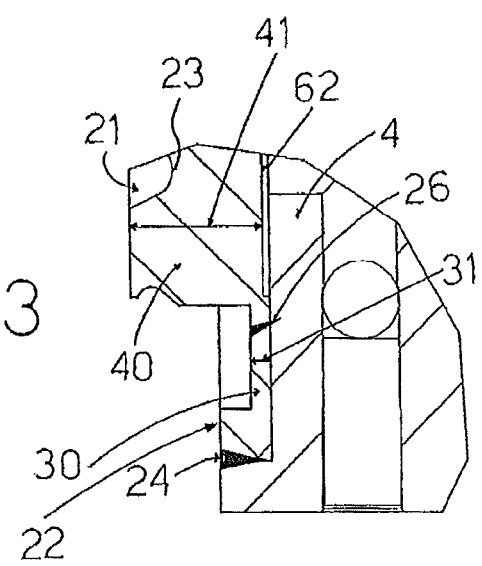
Fig. 2
Fig. 3

PRESSURE TRANSMITTER

RELATED APPLICATION

This application claims priority as a continuation application under 35 U.S.C. §120 to PCT/EP 2009/058292 filed as an International Application on Jul. 1, 2009 designating the U.S., the entire content of which is hereby incorporated by reference in its entirety

FIELD

The present disclosure relates to a pressure transmitter. More particularly, the present disclosure relates to a pressure transmitter used to monitor physical variables in industrial processes, such as for sensing the pressure of a fluid process, for example.

BACKGROUND INFORMATION

Pressure transmitters are devices which are utilized in industrial process control systems in order to detect and/or measure the pressure of a monitored process fluid. Such pressure transmitters can perform differential or absolute pressure measurements and therefore are manufactured according to different layouts and models. Most common pressure transmitters are those indicated as gauge or absolute pressure transmitters and differential pressure transmitters.

In many applications, the use of pressure transmitters is particularly advantageous since from one or more measurements of relative, differential or absolute pressure, it is possible to indirectly obtain values that are indicative of other physical variables of the fluid controlled, where such values would be more difficult to be detected directly.

According to a known configuration, a pressure transmitter of includes a main hollow body, sometime referred to as a module housing or sensor housing body, which is suitably shaped to house components carrying out the transduction. This main body includes a measurement chamber housing a pressure sensor. Suitable primary electric/electronic circuits for processing signals arriving from the pressure sensor may also be housed into the main hollow body.

A transmitter body is coupled to the sensor housing body and contains further components, such as, for example, displays for locally displaying the values measured, secondary electronic circuits for processing the signals arriving from the pressure sensor and for communicating with other transmitters or with remote control units, etc.

In order to perform the required sensing and measurement operations, the pressure transmitter includes a further part or body which must be placed in contact with the process fluid. For this purpose, the additional part is provided with one of more isolation diaphragms which are in fluid communication with the pressure sensor and are suitable to separate the process fluid from the circuit inside the transmitter. At least one of the isolation diaphragms is positioned on this additional part so as to have an external surface exposed directly to the process fluid under monitoring.

This additional part can be a separate body connected to the sensor housing body, for example, by screwing or welding, or it can be realized monolithically with the sensor housing body.

At the current state of the art, although known pressure transmitters can adequately perform the tasks they are required to execute, there is still room for further improvements of their structure and functioning.

For example, some possible drawbacks of known pressure transmitters may result from the way the isolation diaphragms, and more specifically the isolation diaphragms which directly interface with the process fluid under control, are positioned on the body supporting them, especially when pressure transmitters are used in very aggressive environments.

For instance, an isolation diaphragm is usually constituted by a thin metallic membrane which is suitably welded onto its supporting body. When the pressure transmitter is intended for being used in special applications (e.g., environments with hot temperatures, and/or abrasive or corrosive process fluids and so on), the isolation diaphragm is made of special materials, such as nickel alloys.

When this thin membrane made of special material is welded on the supporting body which is usually made of a common metallic material such as a stainless steel, the thin membrane may partially melt and mix with the stainless steel of the supporting body.

Hence, such a welding process, in addition to being quite difficult, can result in a welding seam which is to some extent defective. Furthermore, the mechanical characteristics of the isolation diaphragm are deteriorated, and the isolation diaphragm itself may have one or more points of inception of corrosion, which in some cases results in the diaphragm having to be discarded.

SUMMARY

An exemplary embodiment of the present disclosure provides a pressure transmitter which includes a sensor assembly having a hollow body housing a pressure sensor. The exemplary pressure transmitter also includes a support body which is made of a first material, and an interface body which is connected to the support body and which is made of a second material different from the first material. The exemplary pressure transmitter also includes a first isolation diaphragm which is fixed onto the interface body. The first isolation diaphragm is in fluid communication with the pressure sensor and is configured for interfacing with a process fluid. The first isolation diaphragm is made of the second material.

BRIEF DESCRIPTION OF THE DRAWINGS

Additional refinements, advantages and features of the present disclosure are described in more detail below with reference to exemplary embodiments illustrated in the drawings, in which:

FIG. 2 is a schematic view illustrating, partially in cross-section, an exemplary embodiment of a pressure transmitter according to the present disclosure; and FIG. 3 is an enlarged view of section "A" of FIG. 2.

In the following description and the appended drawings, components equal or functionally equivalent to each other in the exemplary embodiments described below will be indicated by the same reference number for the sake of simplicity.

DETAILED DESCRIPTION

Figure 1:
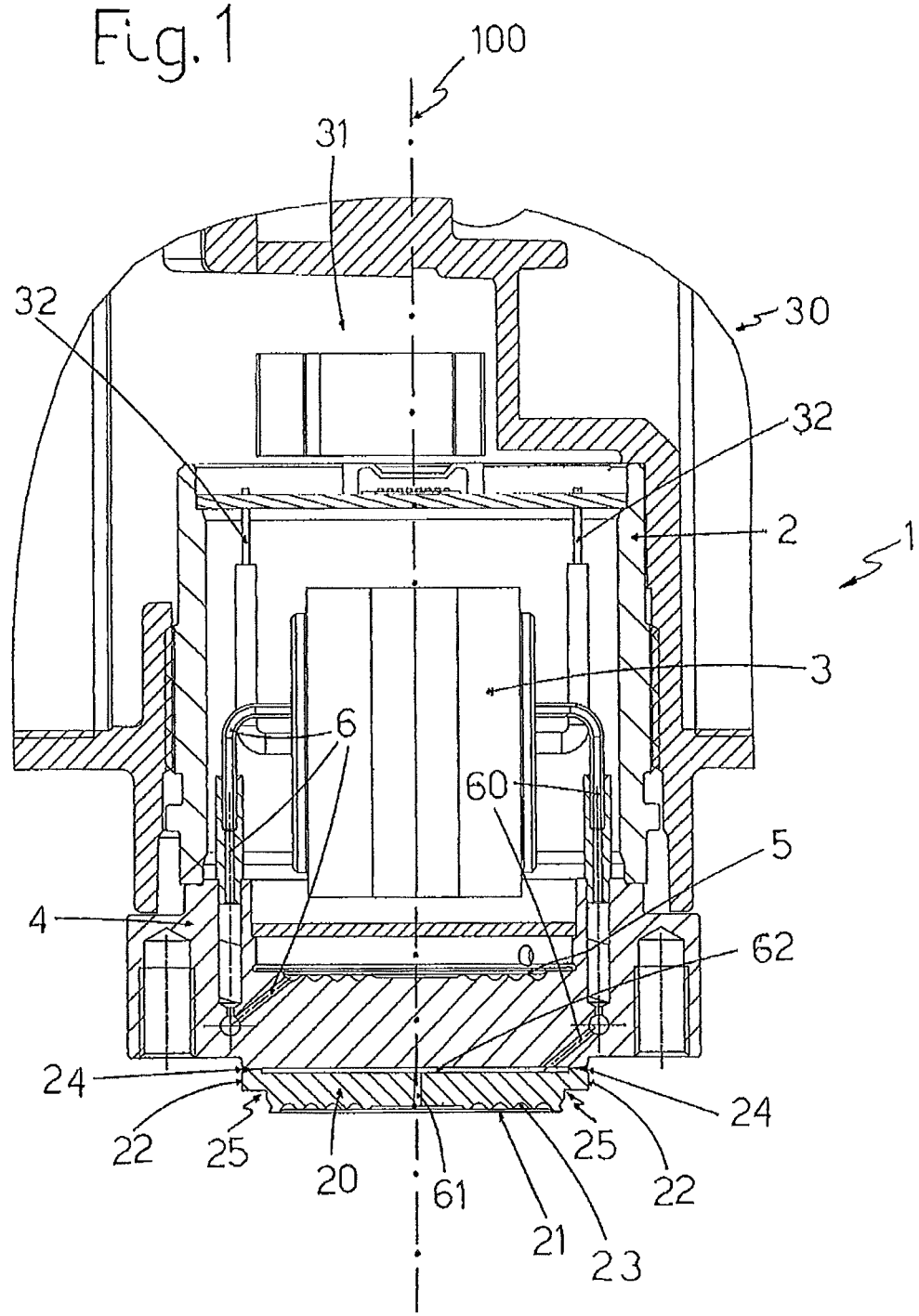
FIG. 1 is a schematic cross-section view illustrating an exemplary embodiment of a pressure transmitter according to the present disclosure.

Exemplary embodiments of the present disclosure provide a pressure transmitter which addresses and overcomes the drawbacks associated with known configurations, as discussed above. For example, an exemplary embodiment of the present disclosure provides a pressure transmitter which includes a sensor assembly having a hollow body housing a pressure sensor, and a support body which is made of a first material.

In accordance with an exemplary embodiment, the pressure transmitter of the present disclosure can also include an interface body which is connected to the support body and is made of a second material different from the first material. The exemplary pressure transmitter of the present disclosure can also include a first isolation diaphragm which is fixed onto the interface body. The first isolation diaphragm is in fluid communication with the pressure sensor and is configured for interfacing with a process fluid. In accordance with an exemplary embodiment, the first isolation diaphragm is made of the second material.

The pressure transmitter according to the present disclosure is indicated as a whole with the reference numeral 1 in FIGS. 1 and 2. In the example of FIG. 1, the pressure transmitter is illustrated as a gauge pressure transmitter according to an exemplary embodiment, while in the example of FIG. 2, the pressure transmitter is illustrated as a differential pressure transmitter according to an exemplary embodiment.

As shown, the pressure transmitter 1 includes a sensor assembly having a hollow main body 2 for housing a sensor, such as a pressure sensor 3 whose structure and functioning, including circuitry, are known to those skilled in the art and therefore will not be described herein in further details. The hollow main body 2 is made of any suitable material, for example, metallic material such as stainless steel.

As schematically illustrated in FIGS. 1 and 2, the pressure transmitter 1 includes a transmitter body 30 which is suitably connected to the sensor assembly, such as to the hollow body 2. The transmitter body 30 houses electric/electronic circuitry 31 which receives input signals from the pressure sensor 3, via connection elements 32 (e.g., cables). In accordance with an exemplary embodiment, the circuitry 31, which can include a microprocessor, for example, elaborates input signals received so as to output a measure of the pressure of a process fluid which is monitored by the pressure transmitter 1 itself. For example, the transmitter body 30 can be made of plastic and/or metallic material.

In the exemplary embodiments illustrated in FIGS. 1 and 2, the pressure transmitter 1 also includes a support body 4 which is made of a metallic material (hereinafter referred to as a "first material"), for example, a common stainless steel such as AISI 316 L. As schematically shown in the exemplary embodiments of FIGS. 1 and 2, the support body 4 is connected to the hollow body 2, for example, by means of soldering and/or through screws. Alternatively, it would be possible to realize the hollow body 2 and the support body 4 as a unique structurally monolithic piece.

Further, the transmitter body 30 may also be realized in a single piece with the hollow body 2 and shaped so as to have inside space enough to accommodate the circuitry 31 and other components.

In accordance with an exemplary embodiment, the pressure transmitter 1 according to the present disclosure also includes an interface body 20 which is connected to the support body 4 and which is made of a metallic material (hereinafter referred to as a "second material"), which is different from the first material of the supporting body 4.

In addition, the pressure transmitter 1 includes at least one isolation diaphragm 21 (hereinafter referred to as a "first isolation diaphragm") which is positioned onto the interface body 20. In accordance with an exemplary embodiment, the first isolation diaphragm 21 can be made of the same material of the interface body 20.

For example, the first isolation diaphragm 21 can be fixed onto the interface body 20 so as to have (with respect to the interface body 20 itself) its external surface suitable (e.g., configured) for interfacing with a process fluid whose pressure is to be measured.

In accordance with an exemplary embodiment, the second material of the interface body 20 (and of the first isolation diaphragm 21 according to an exemplary embodiment) is selected from the group consisting of: nickel-based alloys, duplex and super-duplex stainless steel materials. According to an exemplary embodiment, the interface body 20 and the isolation diaphragm 21 are made of nickel-based alloys commercially known as MONEL 400 or MONEL K500.

In accordance with an exemplary embodiment, the first isolation diaphragm 21 is welded (e.g., laser welded) onto the support interface body 20.

The interface body 20 can be differently shaped according to various applications. For instance, the interface body 20 may be ring-shaped, disc shaped, or might have a substantial fully solid body (e.g., a full cylinder body).

For example, in the exemplary embodiment illustrated in FIG. 1, the interface body 20 has a substantially full body provided at one end surface with a corrugated surface 23 on which the first isolation diaphragm 21 is fixed (e.g., laser welded) and with a cross section featuring a step 25.

As illustrated, in the exemplary embodiment of FIG. 1, the interface body 20 is positioned at one end surface of the support body 4 and is connected to the support body 4 itself.

In accordance with an exemplary embodiment, the interface body 20 can be welded (e.g., laser welded) onto the support body 4 along at least a first welding seam 24.

For example, according to the exemplary embodiment illustrated in FIG. 1, the interface body 20 is connected to the support body 4 along a surface 22 transversal with respect to the first isolation diaphragm 21 (and parallel to a reference longitudinal axis 100). In accordance with an exemplary embodiment, the location of the welding seam 24 on the transversal surface 22 along which the interface body 20 is connected to the support body 4 is spaced apart from the first isolation diaphragm 21.

In this way, the mechanical characteristics of the diaphragm 21 are not negatively affected by the joining process.

Further, in the exemplary embodiment illustrated in FIG. 1, on the support body 4 there is provided another isolation diaphragm 5 (hereinafter referred to as a "second isolation diaphragm").

The second isolation diaphragm 5 is, for example, welded (e.g., laser welded) onto the support body 4 and is in fluid communication with the pressure sensor 3 by means of a hydraulic circuit 6 filled with a fluid (e.g., an incompressible fluid, such as a silicon oil).

The second isolation diaphragm 5 includes, for example, a thin elastic membrane made of metal such as, for example, AISI 316L, or a suitable nickel-based alloy.

As illustrated in FIG. 1, the first isolation diaphragm 21 is also in fluid communication with the pressure sensor 3 via a hydraulic circuit 60 which is equivalent to the circuit 6 and is filled with the same and/or a similar type of incompressible fluid. The hydraulic circuit 60 includes a section 61, for example, a through channel 61 provided on the interface body 20, and a thin gap 62 left between the interface body 20 and the support body 4.

In accordance with an exemplary embodiment, the first isolation diaphragm 21 is arranged—for example, its thickness and size and any other suitable parameters—are selected so as to have along the axis 100 substantially the same linear displacement of that of the second isolation diaphragm 5 when the first and the second isolation diaphragms 21, 5 are subject to substantially the same level of pressure exerted on them by the incompressible fluid of the circuit 6 and by the process fluid, respectively.

In the exemplary embodiment illustrated in FIGS. 2 and 3, the interface body 20 has a disc-shaped configuration which is positioned around the support body 4 so as to embrace a portion thereof, and also has a corrugated surface 23 on which the first isolation diaphragm 21 is positioned.

In accordance with an exemplary embodiment, there are provided two isolation diaphragms 21 which are fixed (e.g., laser welded) onto the corrugated surface 23 so that each of them has its external surface suitable for interfacing with the process fluid whose pressure is to be measured.

In this case, both isolation diaphragms 21 can be made of the same material of the interface body 20, namely, a second material selected from the group consisting of: nickel-based alloys, duplex or super-duplex stainless steel materials, for example, a nickel-based alloys commercially known as MONEL 400 or MONEL K500.

As illustrated, the two isolation diaphragms 21 are fixed onto the interface body 20 opposite to each other with respect to the reference longitudinal axis 100 and extend substantially parallel to the axis 100 itself, while in the exemplary embodiment of FIG. 1, the isolation diaphragm 21 (and the second isolation diaphragm 5 as well) is positioned transversal with respect to the longitudinal axis 100.

The two isolation diaphragms 21 are in fluid communication with the pressure sensor 3 via a hydraulic circuit (equivalent to that illustrated in FIG. 1) which is filled with an incompressible fluid, such as a silicon oil, and includes (for each side) a through channel 61, a thin gap 62 and passageways 63 provided onto the support body 4.

In accordance with an exemplary embodiment, the interface body 20 can be welded (e.g., laser welded) onto the support body 4.

For instance, according to this exemplary embodiment, the interface body 20 is connected to the support body 4 on a surface 22 substantially parallel to the couple of first isolation diaphragms 21 along a first welding seam 24 which is spaced apart from the isolation diaphragms 21 themselves.

In this way, the mechanical characteristics of the diaphragm 21 are not negatively affected by the joining process.

According to an exemplary embodiment illustrated in more detail in FIG. 3, the interface body 20 (seen in cross-section) includes a first portion 30 and a second portion 40. The first portion 30 has a thickness 31 smaller than the thickness 41 of the second portion 40. The interface body 20 is welded (e.g., laser welded) onto the support body 4 along a second welding seam 26 located at the first portion 30 and spaced apart from the first welding seam 24 (and the isolation diaphragms themselves).

In practice, when the pressure transmitter is mechanically connected to a pipe of the process, for example, by means of one or more flanges, the first portion 30 forms a thin flexible rim which allows absorbing possible deformations and therefore reducing consequent error measurements induced by this mechanical connection.

The same result may be achieved by suitably sizing the step 25 of the interface body 20 illustrated in FIG. 1.

In practice, it has been seen how the pressure transmitter 1 according to the present disclosure achieves the intended object of providing improvements over known solutions. For example, the purposive introduction of the interface body 20 and the selection of the same material for the interface body 20 and the isolation diaphragm(s) 21 realizes a junction between these two elements which does not lead to a deterioration of the characteristics of the interfacing isolation diaphragm, thus preventing problems of corrosion inception typical of known solutions.

The pressure transmitter 1 thus conceived may undergo numerous modifications and variants all coming within the scope of the inventive concept as specified by the appended claims. For example, the interface body 20 and/or the support body 4 can have a different shape or size, the hydraulic circuits 6, 60 can be differently shaped, etc., provided that such possible modifications are compatible with the functions the various elements are required to perform.

Moreover, all parts/components can be replaced with other technically equivalent elements. For example, the type of materials within the scope of the foreseen applications described above, and the dimensions, can be any according to needs and to the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A pressure transmitter comprising:
   a sensor assembly having a hollow body housing a pressure sensor;
   a support body which is made of a first material;
   an interface body which is connected to the support body and is made of a second material different from the first material; and
   a first isolation diaphragm which is fixed onto the interface body, the first isolation diaphragm being in fluid communication with the pressure sensor and configured for interfacing with a process fluid,
   wherein the first isolation diaphragm is made of the second material.

2. The pressure transmitter according to claim 1, wherein the interface body is connected to the support body on a surface transverse with respect to the first isolation diaphragm.

3. The pressure transmitter according to claim 1, wherein the interface body is connected to the support body on a surface substantially parallel to the first isolation diaphragm.

4. The pressure transmitter according to claim 1, wherein the interface body is welded onto the support body along at least a first welding seam provided on a surface which is spaced apart from the first isolation diaphragm.

5. The pressure transmitter according to claim 1, comprising:
   a second isolation diaphragm which is placed on the support body and in fluid communication with the pressure sensor,
   wherein the first isolation diaphragm is arranged so as to have substantially the same linear displacement of the second isolation diaphragm when the first and second isolation diaphragms are subject to substantially the same level of pressure.

6. The pressure transmitter according to claim 5, wherein the second isolation diaphragm is welded onto said support body.

7. The pressure transmitter according to claim 1, comprising:
   a second isolation diaphragm which is fixed onto the interface body, the second isolation diaphragm being in fluid communication with the pressure sensor and configured for interfacing with a process fluid, wherein said second isolation diaphragm is made of the second material.

8. The pressure transmitter according to claim 1, wherein said interface body has a corrugated surface on which at least said first isolation diaphragm is welded.

9. The pressure transmitter according to claim 1, wherein:
the interface body has a disc-shaped body embracing the support body and includes a first portion and a second portion; and
the first portion has a thickness smaller than a thickness of the second portion.

10. The pressure transmitter according to claim 9, wherein the interface body is welded onto the support body along a second welding seam located at the first portion and spaced apart form the first welding seam.

11. The pressure transmitter according to claim 1, wherein the interface body and the first isolation diaphragm are made of the second material which is selected from the group consisting of: nickel-based alloys, duplex and super-duplex stainless steels.

12. The pressure transmitter according to claim 2, wherein the interface body is welded onto the support body along at least a first welding seam provided on the surface which is spaced apart from the first isolation diaphragm.

13. The pressure transmitter according to claim 12, comprising:
a second isolation diaphragm which is placed on the support body and in fluid communication with the pressure sensor,
wherein the first isolation diaphragm is arranged so as to have substantially the same linear displacement of the second isolation diaphragm when the first and second isolation diaphragms are subject to substantially the same level of pressure.

14. The pressure transmitter according to claim 13, wherein the second isolation diaphragm is welded onto said support body.

15. The pressure transmitter according to claim 12, comprising:
a second isolation diaphragm which is fixed onto the interface body, the second isolation diaphragm being in fluid communication with the pressure sensor and configured for interfacing with a process fluid,
wherein said second isolation diaphragm is made of the second material.

16. The pressure transmitter according to claim 15, wherein:
the interface body has a disc-shaped body embracing the support body and includes a first portion and a second portion; and
the first portion has a thickness smaller than a thickness of the second portion.

17. The pressure transmitter according to claim 16, wherein the interface body is welded onto the support body along a second welding seam located at the first portion and spaced apart form the first welding seam.

18. The pressure transmitter according to claim 3, wherein the interface body is welded onto the support body along at least a first welding seam provided on the surface which is spaced apart from the first isolation diaphragm.

19. The pressure transmitter according to claim 18, comprising:
a second isolation diaphragm which is placed on the support body and in fluid communication with the pressure sensor,
wherein the first isolation diaphragm is arranged so as to have substantially the same linear displacement of the second isolation diaphragm when the first and second isolation diaphragms are subject to substantially the same level of pressure.

20. The pressure transmitter according to claim 19, wherein the second isolation diaphragm is welded onto said support body.

21. The pressure transmitter according to claim 18, comprising:
a second isolation diaphragm which is fixed onto the interface body, the second isolation diaphragm being in fluid communication with the pressure sensor and configured for interfacing with a process fluid,
wherein said second isolation diaphragm is made of the second material.

22. The pressure transmitter according to claim 17, wherein the interface body and the first isolation diaphragm are made of the second material which is selected from the group consisting of: nickel-based alloys, duplex and super-duplex stainless steels.

23. The pressure transmitter according to claim 21, wherein the interface body and the first isolation diaphragm are made of the second material which is selected from the group consisting of: nickel-based alloys, duplex and super-duplex stainless steels.

\* \* \* \* \*